United States Patent [19]

Velarde, Jr.

[11] 4,378,667
[45] Apr. 5, 1983

[54] DISPOSABLE TAIL SLEEVE ENVELOPING ASSEMBLY

[76] Inventor: Ernest Velarde, Jr., Rte. 1, Box 472, Markleeville, Calif. 96120

[21] Appl. No.: 317,268

[22] Filed: Nov. 2, 1981

[51] Int. Cl.³ ............................................. A01K 13/00
[52] U.S. Cl. ........................................ 54/78; 119/105
[58] Field of Search ............................ 54/78; 119/105; 128/157, 169, 170; 132/49

[56] References Cited

U.S. PATENT DOCUMENTS

| 127,918 | 6/1872 | Parson et al. | 54/78 |
| 148,367 | 3/1874 | Howard | 54/78 |
| 209,737 | 11/1878 | Weide | 54/78 |
| 385,721 | 7/1888 | Muntz | 54/78 |
| 1,343,147 | 6/1920 | Liechty | 54/78 |

Primary Examiner—Gene Mancene
Assistant Examiner—Kris R. Schulze
Attorney, Agent, or Firm—William C. Babcock

[57] ABSTRACT

An inexpensive, sanitary, disposable assembly for enveloping the tail of an animal that is particularly useful in breeding and foaling. The assembly includes a guide ring that supports an elongate sleeve in overlapping folds, which ring may have the tail of the animal extended therethrough to dispose the ring adjacent the tail bone of the animal. A first end of the sleeve is removably secured to the tail bone, with the guide ring thereafter being moved away from the tail bone, and the sleeve peeling from the guide ring until none remains thereon. The guide ring is then discarded and the outer second end of the sleeve knotted for the sleeve to envelop the tail, preferably when the tail is in a doubled over configuration.

7 Claims, 6 Drawing Figures

DISPOSABLE TAIL SLEEVE ENVELOPING ASSEMBLY

DESCRIPTION OF THE PRIOR ART

Prior to the present invention it was common practice to wrap the tails of mares prior to breeding which is time consuming and unsatisfactory, and the wrap having to be removed by cutting with a knife or scissors after the breeding is completed.

A major object of the present invention is to provide a sanitary, disposable, inexpensive assembly that is simple and easy to use, and one that removably envelops the tail of the mare in a light weight woven sleeve that is discarded after the breeding is completed.

SUMMARY OF THE INVENTION

A light weight guide ring of substantial width that has first and second laterally spaced circumferential edges on which an elongate light weight woven sleeve is supported in overlapping folds. The ring and sleeve encircle the tail of the mare or other animal being bred, with the ring then being moved upwardly to a position adjacent the tail bone. A first end of the sleeve is removably secured to the tail bone by tensioned resilient strips that are knotted. The guide ring is then moved away from the tail bone, with the folds of the sleeve sequentially peeling therefrom until none remains on the ring. The ring is now discarded.

The second or outer end of the sleeve is knotted after the tail of the animal is doubled over to be within the confines of the sleeve. After the breeding operation is completed the resilient straps are unknotted, and the sleeve is slipped from the tail of the mare and discarded.

DESCRIPTION OF THE PREFERRED EMBODIMENT

Figure 1:
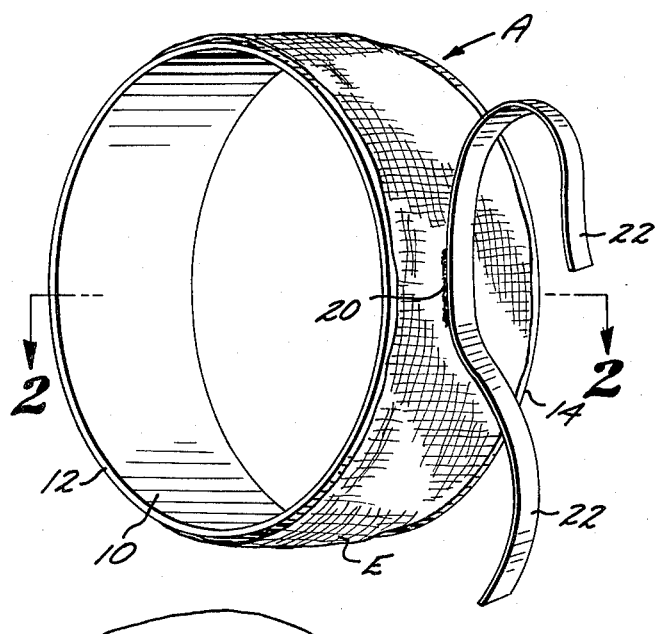
FIG. 1 is a perspective view of the tail enveloping assembly prior to use and in the condition it would be purchased by a breeder.
Figure 2:
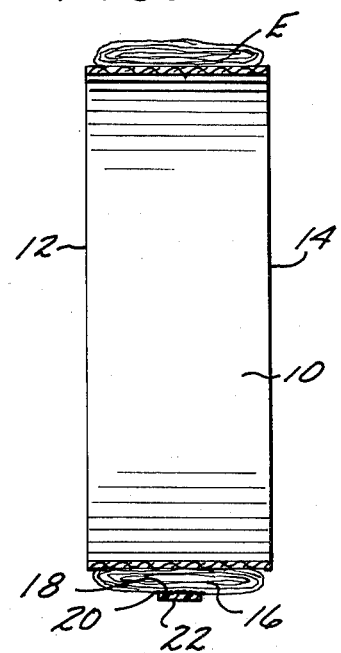
FIG. 2 is a transverse cross sectional view of the assembly taken on the line 2—2 of FIG. 1.

The tail enveloping assembly A is shown in FIG. 1, in the position it would occupy prior to use in enveloping the tail B of a mare C or other animal having a tail bone D.

Assembly A includes a guide ring 10, preferably formed from cardboard or like inexpensive material, which ring is of substantial width and has laterally spaced first and second circumferential edges 12 and 14.

An elongate tubular sleeve E is provided that is formed from a light weight net sheet material of substantial strength, which sleeve is wound in over lapping folds 16 on the exterior surface of the ring 10. The sleeve has a first end 18 from which a tab 20 extends. An elastomeric strap 22 is secured at substantially the center thereof to the tab 20.

Figure 3:
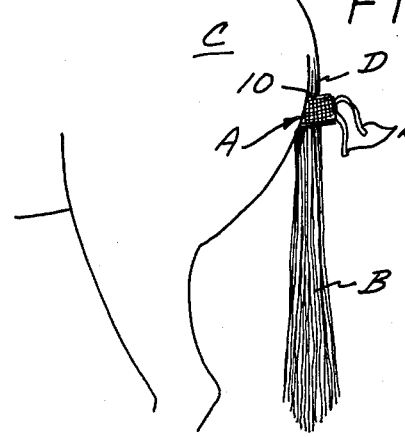
FIG. 3 illustrates the assembly after the tail of a mare has been extended therethrough and the assembly disposed adjacent the tail bone of the animal.
Figure 4:
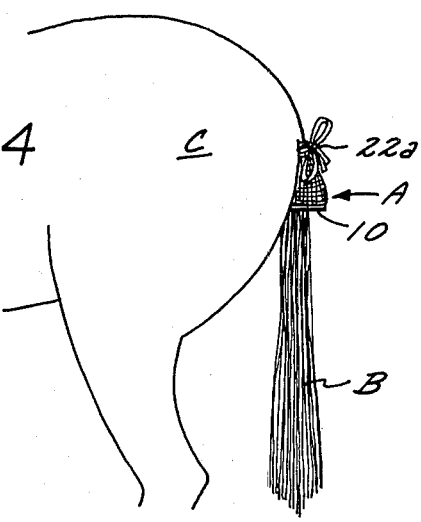
FIG. 4 is the same view as shown in FIG. 3 after a first end of the sleeve has been removably secured to the tail bone of the mare.

In use, the assembly A has the tail B guided therethrough a shown in FIG. 3, with the assembly being moved upwardly on the tail to dispose the guide ring adjacent the tail bone D. The straps 22 are now extended in opposite directions around the tail bone D and formed into a knot 22a to removably secure the first end 18 of the sleeve to the tail bone.

The guide ring 10 is now moved downwardly on the tail B with folds 16 of the sleeve E peeling therefrom sequentially until no folds remain on the guide ring 10, which guide ring is now discarded.

Figure 5:
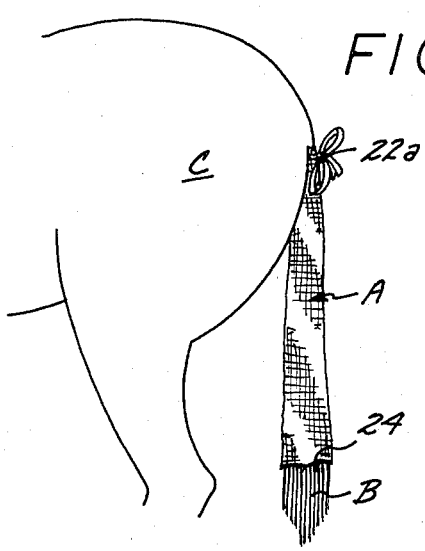
FIG. 5 is the same view as shown in FIG. 4 after the guide ring has been moved downwardly on the tail of the mare for folds of the sleeve to sequentially peel from the ring until none remains thereon, with the guide ring then being discarded.
Figure 6:
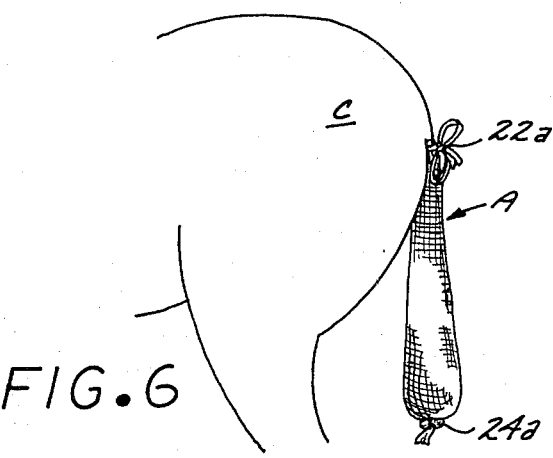
FIG. 6 illustrates the second end of the sleeve being knotted, for the sleeve to removably envelop the tail of the mare prior to the breeding operation, with the tail preferably being in a doubled over position within the sleeve that removably envelops the same.

The second end 24 of the sleeve will now occupy the position on tail B as shown in FIG. 5. The tail B is now doubled over and forced upwardly into the confines of the sleeve E, with the second end being formed into a knot 24a as shown in FIG. 6. Assembly A now removably envelops the tail B. After the breeding operation is completed the knot 22a is undone and the sleeve E slipped from the tail B and discarded.

Although the assembly A has been shown and described as being used on a mare C, it is equally adapted for use on other animals having tails either for breeding, foaling or for show purposes.

The use and operation of the invention has been described previously in detail and need not be repeated.

What is claimed is:

1. A disposable assembly for substantially enveloping the tail of an animal having a tail bone, said assembly including:
   a. a guide ring of substantial width and of such internal diameter as to encircle said tail of said animal, said ring having first and second laterally spaced circular edges, and said ring capable of being moved longitudinally on said tail to dispose said first edge over said tail bone;
   a. an elongate tubular sleeve of a light weight woven material that is wound in over lapping circular folds on said ring, said sleeve having first and second ends, and said sleeve including a tab on said first end that is adjacent said first circumferential edge;
   c. a resilient elongate strip that extends in opposite directions from said tab, said strip capable of being disposed to encircle said tail bone in a tensioned condition and then knotted to removably hold said first end of said sleeve on said tail bone, with said ring and the balance of said sleeve being moved longitudinally away from said tail bone, with said sleeve peeling from said ring until none remains thereon, with said ring now being discarded, and said second end of said sleeve knotted for said sleeve to substantially envelop said tail.

2. A disposable assembly as defined in claim 1, in which the interior diameter of said sleeve is sufficiently great that the tail of said animal may be disposed in a doubled over configuration therein prior to said second end of said sleeve being knotted.

3. A disposable assembly as defined in claim 1, in which said guide ring is a light weight cardboard.

4. A disposable assembly as defined in claim 1, in which said sleeve is formed from light weight woven netting of substantial strength.

5. A disposable assembly as defined in claim 1, in which said strip is formed from an elastomeric material.

6. A disposable assembly as defined in claim 5, in which said elastomeric material is rubber.

7. A disposable assembly as defined in claim 1, in which said tab forms a part of the uppermost of said folds.

* * * * *